Aug. 10, 1937.  D. S. ROBBINS  2,089,857
CLAMP FOR SECURING CABLES
Filed June 13, 1936
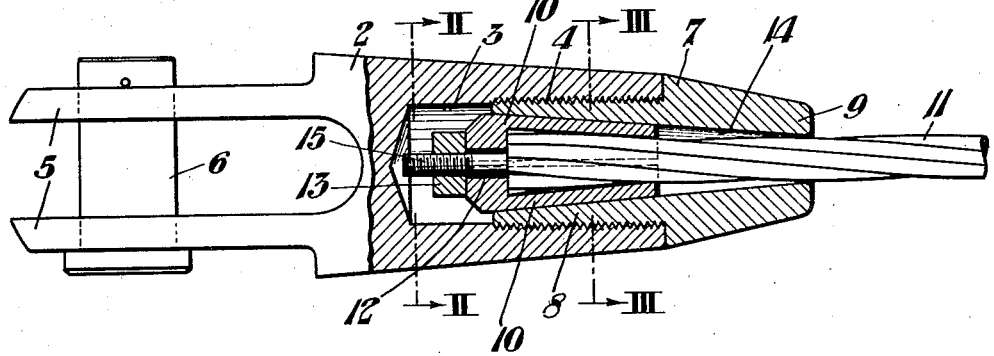
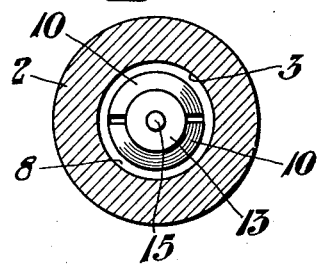 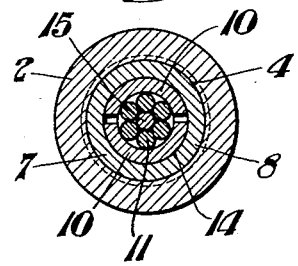
Inventor:
DAVID S. ROBBINS,
by: Usina & Rauber
his Attorneys.

Patented Aug. 10, 1937

2,089,857

UNITED STATES PATENT OFFICE 2,089,857

CLAMP FOR SECURING CABLES

David S. Robbins, Worcester, Mass., assignor to The American Steel and Wire Company of New Jersey, a corporation of New Jersey Application June 13, 1936, Serial No. 85,176

11 Claims. (Cl. 24—126)

This invention relates to means for securing or anchoring cables. The invention more particularly relates to improved apparatus for securing cables so that each strand of the cable is given a proportionate share of the cable's load.

Heretofore, difficulty has been encountered in holding cables by mechanical fittings so as to allow the cable to carry its maximum tensile load due to the fact that the load is not divided proportionally between the strands of the cable and the load limit of the cable is thereby decreased.

The general object of this invention is to provide a cable securing apparatus which allows the cable to bear its maximum tensile load.

In accordance with the patent statutes one best known form of the invention will now be described, the same being illustrated in the accompanying drawing wherein:

Figure 1 is an elevation partly in longitudinal section of the assembled clamp holding a cable.

Figure 2 is a cross-section taken on line II—II of Figure 1.

Figure 3 is a cross-section taken on line III—III of Figure 1.

Figure 4 is an elevation of a cable prepared for the clamp.

In the specific form of the invention shown in the accompanying drawing, the numeral 2 indicates generally a basket having a cylindrical recess 3 provided with a threaded female length 4. The basket 2 can be secured to an anchor or other similar member (not shown) by any convenient means such as integral forks 5 removably receiving a pin 6. Co-operating with and received in the basket 2 is a sleeve 7 having a threaded male portion 8 engaging with the female thread 4 of the basket 2. The sleeve, which has an internal tapered surface 14, is formed with a conically shaped end 9 having an outer surface terminating substantially flush with the outer surface of the basket 2 when the male threads 8 are engaged with the female threads 4. The sleeve end 9 serves to strengthen the sleeve 7 and gives the holding means a smooth appearance but the desired results could be obtained by other suitable means.

A conically shaped, longitudinally split ring clamp 10, in two or more parts, fits smoothly into the sleeve 7 as the external taper of the clamp 10 is made the same as the taper of the tapered surface 14 of the sleeve 7. The clamp 10 has a tapered bore or aperture, increasing in size, extending into but not through it with the aperture receiving the end of a cable 11. The aperture in the clamp 10 is tapered so that it exerts its greatest radial compressing force at the point immediately within the clamp 10 when the clamp 10 is forced into the sleeve 7 to thereby clamp the cable 11. This force decreases the diameter of the cable 11 most at the point just within the clamp 10 so that a wedging action of the cable 11 in the clamp 10 is secured in addition to the aforesaid clamping action. This wedging action is a feature of the invention, but is not absolutely necessary to it as the clamping action of a clamp having an inside surface parallel to the cable 11 could be safely used in many cases.

The clamp 10 has an axially extending hole 12 therethrough which receives the core 15 of the cable 11. The core 15 of the cable 11 is bared and threaded in preparation for use in this apparatus and a nut 13 is provided which engages the core 15 emerging from the hole 12 of the clamp 10 and, as shown in the drawing, the nut is tightened against the base of the clamp 10.

In operation the clamp 10 is first assembled on the cable 11 and the clamp 10 has its small end inserted into the end of the sleeve 7. As the sleeve 7 is threaded into the basket 3, the end of the clamp and cable assembly contacts with the closed end of the recess 3 in the basket 2 so as to force the clamp into the sleeve 7, and the tapered surface of said sleeve co-operates with the tapered surface of the clamp 10 to cause the clamp to firmly grip the cable 11. Now, when a load is placed on the cable 11, it is first taken by the core 15; which causes pressure to be exerted by the nut 13 on the clamp 10 forcing it further into the sleeve 7 so that the above described clamping and wedging action is produced on the cable 11.

This invention may be used to fasten both ferrous and non-ferrous cables, but it is particularly adapted to fastening cables having fairly soft outer strands. It also can be used to fasten a cable consisting of but a single wire or a cable having strands and cores of different metals as the same principles still apply.

The apparatus is not expensive to manufacture or maintain due to its simple construction and, being sturdily made, it operates satisfactorily for many years. The assembly and installation time required in order to secure a cable in accordance with this invention is relatively short and can easily be done by an unskilled laborer.

Another advantage of the invention is that it does not harm the cable and the cable end can be put into and taken from the holding means many times without injuring the cable.

The basket 2 of the invention can be made to couple two cables by extending its length and making cylindrical recesses in both ends of it as will be understood.

The means for transferring part of the load on the core to the other strands of the cable can be modified and the invention contemplates welding, riveting or even bending over the core so that it bears against the clamp 10 forcing it into engagement with the cable 11.

It will be appreciated that the scope of the invention is not limited to the specific forms illustrated and described but is actually defined by the appended claims.

I claim:

1. A cable clamp assembly comprising a basket having a threaded cylindrical recess, a sleeve having a threaded male portion engaging with said recess, said sleeve having its bore tapered from its engaged end to its other extremity and having a conically shaped end protruding from said basket, a conically shaped longitudinally split ring clamp having the same external taper as the taper of said sleeve bore, said clamp being provided with a tapered cable receiving bore increasing in size and extending into but not through said clamp, said clamp also being provided with a hole extending axially through the closed end thereof, a metal cable with its core exposed and threaded extending into the bore of said clamp and its core through said hole in said clamp, and a nut threaded on said core and securing it by exerting pressure against the base of said clamp to force it into said sleeve.

2. A coupling for cables comprising a basket having a threaded cylindrical recess, a sleeve having a threaded male portion engaging with said recess, said sleeve having its bore tapered from its engaged end to its other extremity and having a conically shaped end protruding from said basket, a conically shaped longitudinally split ring clamp having the same external taper as the taper of said sleeve bore, said clamp being provided with a tapered cable receiving bore increasing in size and extending into but not through said clamp, said clamp also being provided with a hole extending axially through the closed end thereof, a metal cable with its core exposed and threaded extending into the bore of said clamp and its core through said hole in said clamp, and a nut threaded on said core and securing it by exerting pressure against the base of said clamp to force it into said sleeve.

3. A cable clamp assembly comprising a basket having a threaded cylindrical recess, a sleeve having a threaded male portion engaging with said recess, said sleeve having its bore tapered from its engaged end to its other extremity and protruding from said basket, a conically shaped longitudinally split ring clamp having the same external taper as the taper of said sleeve bore, said clamp being provided with a tapered cable receiving bore increasing in size and extending into but not through said clamp, said clamp also being provided with a hole extending axially through the closed end thereof, a metal cable with its core exposed and threaded extending into the bore of said clamp and its core through said hole in said clamp, and a nut threaded on said core and securing it by exerting pressure against the base of said clamp to force it into said sleeve.

4. A cable clamp assembly comprising a basket having a threaded cylindrical recess, a sleeve having a threaded male portion engaging with said recess, said sleeve having its bore tapered from its engaged end to its other extremity, a conically shaped longitudinally split ring clamp having the same external taper as the taper of said sleeve bore, said clamp being provided with a tapered cable receiving bore increasing in size and extending into but not through said clamp, said clamp also being provided with a hole extending axially through the closed end thereof, a metal cable with its core exposed and threaded extending into the bore of said clamp and its core through said hole in said clamp, and a nut threaded on said core.

5. A cable clamp assembly comprising a basket having a threaded cylindrical recess, a sleeve having a threaded male portion engaging with said recess, said sleeve having its bore tapered from its engaged end to its other extremity, a conically shaped longitudinally split ring clamp having the same external taper as the taper of said sleeve bore, said clamp being provided with a tapered cable receiving bore increasing in size and extending into but not through said clamp, said clamp also being provided with a hole extending axially through the closed end thereof, a metal cable extending into the bore of said clamp and through said hole in said clamp, and a nut threaded on said cable.

6. A cable clamp assembly comprising a basket having a threaded cylindrical recess, a sleeve having a threaded male portion engaging with said female recess, said sleeve having its bore tapered from its engaged end to its other extremity, a conically shaped longitudinally split ring clamp having the same external taper as the taper of said sleeve bore, said clamp being provided with a tapered cable receiving bore increasing in size and extending into but not through said clamp and a hole extending axially through the closed end thereof, a metal cable with its core exposed extending into the bore of said clamp and its core through said hole in said clamp, and means for transferring any load upon said core to the rear portion of said clamp.

7. A cable clamp assembly comprising a basket having a threaded cylindrical recess, a sleeve having a threaded male portion engaging with said female recess, said sleeve having its bore tapered from its engaged end to its other extremity, a conically shaped longitudinally split ring clamp having a tapered cable receiving bore increasing in size and extending into but not through said clamp and a hole extending axially through the closed end thereof, a metal cable with its core exposed and threaded extending into the bore of said clamp and its core through said hole in said clamp, and a nut threaded on said core.

8. A cable clamp assembly comprising a basket having a threaded cylindrical recess, a sleeve having a threaded male portion engaging with said female recess, said sleeve having its bore tapered from its engaged end to its other extremity, a conically shaped longitudinally split ring clamp having the same external taper as the taper of said sleeve bore said clamp being provided with a cable receiving bore extending into but not through said clamp and a hole extending axially through the closed end thereof, a metal cable with its core exposed and threaded extending into the bore of said clamp and its core through said hole in said clamp, and a nut threaded on said core.

9. Apparatus for securing a strand of wires including a core wire and at least one layer of wires over this core wire, said apparatus comprising a constrictive clamp in which the entire end portion of said strand is adapted to be inserted and gripped thereby, said constrictive clamp being provided with a longitudinally extending hole to allow said core wire to extend through the rear end of said constrictive clamp when the wires of said layer are trimmed back to make said core wire project beyond the remainder of said strand, a positioning member having a tapered bore which is adapted to receive said constrictive clamp, said bore decreasing in size in the direction in which said strand is to be tensioned, and means for connecting said core wire to the rear portion of said constrictive clamp whereby said constrictive clamp is forced farther into the bore of said positioning member when said strand is tensioned so as to increase its grip on said strand.

10. A clamp for cables including a core strand and other strands laid around said core strand, said clamp comprising a constrictive sleeve-like clamp having a bore which is adapted to enclose the end portion of the strands laid around the core strand of the cable, a positioning member having a tapered bore which is adapted to receive said constrictive sleeve-like clamp and force the same into gripping relation with the strands laid around the core of the cable as said constrictive sleeve-like clamp is received therein, and means connecting the core strand of the cable with said constrictive sleeve-like clamp so as to force said constrictive sleeve-like clamp into said positioning member when tension is applied to said cable whereby said constrictive sleeve-like clamp is forced to increase its gripping relation with said cable.

11. A cable clamp assembly comprising a constrictive clamp having a bore which is constructed and arranged to receive the end of a cable therein, said bore decreasing in size in the direction in which the cable is to be tensioned, a positioning member having a tapered bore which is adapted to receive said constrictive clamp and force the same into gripping relation with said cable as said constrictive clamp is received therein, and means for forcing said constrictive clamp into said positioning member when tension is set up in said cable whereby said constrictive clamp is forced to increase its gripping relation with said cable.

DAVID S. ROBBINS.